United States Patent
Hickey

(10) Patent No.: US 12,515,991 B2
(45) Date of Patent: Jan. 6, 2026

(54) CEMENT BOARD WITH WATER-RESISTANT ADDITIVE

(71) Applicant: PermaBASE Building Products, LLC, Charlotte, NC (US)

(72) Inventor: James Hickey, Jacksonville, FL (US)

(73) Assignee: PermaBASE Building Products, LLC, Charlotte, NC (US)

( * ) Notice: Subject to any disclaimer, the term of this patent is extended or adjusted under 35 U.S.C. 154(b) by 0 days.

(21) Appl. No.: 18/356,328

(22) Filed: Jul. 21, 2023

(65) Prior Publication Data
US 2023/0357078 A1   Nov. 9, 2023

Related U.S. Application Data

(63) Continuation of application No. 17/155,238, filed on Jan. 22, 2021, now Pat. No. 11,746,051.

(60) Provisional application No. 62/965,347, filed on Jan. 24, 2020.

(51) Int. Cl.
| | |
|---|---|
| C04B 28/06 | (2006.01) |
| C04B 7/12 | (2006.01) |
| C04B 14/06 | (2006.01) |
| C04B 16/08 | (2006.01) |
| C04B 24/08 | (2006.01) |
| C04B 28/14 | (2006.01) |
| C04B 111/00 | (2006.01) |
| C04B 111/27 | (2006.01) |
| C04B 111/40 | (2006.01) |

(52) U.S. Cl.
CPC ............... C04B 28/06 (2013.01); C04B 7/12 (2013.01); C04B 14/06 (2013.01); C04B 16/08 (2013.01); C04B 24/085 (2013.01); C04B 28/14 (2013.01); C04B 2111/00612 (2013.01); C04B 2111/0062 (2013.01); C04B 2111/27 (2013.01); C04B 2111/40 (2013.01)

(58) Field of Classification Search
None
See application file for complete search history.

(56) References Cited

U.S. PATENT DOCUMENTS

| | | | |
|---|---|---|---|
| 2,032,071 A | 2/1936 | Scholz | |
| 2,207,336 A | 7/1940 | Yanick | |
| 3,865,601 A * | 2/1975 | Serafin | C04B 28/02 106/659 |
| 5,108,511 A | 4/1992 | Weigland | |
| 6,409,818 B1 * | 6/2002 | Johnson | C04B 28/02 106/608 |
| 6,676,744 B2 | 1/2004 | Merkley et al. | |
| 6,676,745 B2 | 1/2004 | Merkley et al. | |
| 6,777,103 B2 | 8/2004 | Merkley et al. | |
| 7,998,267 B2 | 8/2011 | Gartner et al. | |
| 8,080,103 B2 | 12/2011 | Venon et al. | |
| 8,574,360 B2 | 11/2013 | Feng et al. | |
| 8,603,238 B2 | 12/2013 | Schwartzentruber et al. | |
| 8,801,851 B2 | 8/2014 | Jezequel et al. | |
| 8,808,449 B2 | 8/2014 | Jezequel et al. | |
| 8,992,680 B2 | 3/2015 | Sabio et al. | |
| 9,376,348 B2 | 6/2016 | Johannessen et al. | |
| 9,732,524 B2 | 8/2017 | Grundy et al. | |
| 2005/0016423 A1 | 1/2005 | Merkley et al. | |
| 2005/0126430 A1 | 6/2005 | Lightner et al. | |
| 2007/0131145 A1 | 6/2007 | Biscan et al. | |
| 2010/0197818 A1 * | 8/2010 | Sweat | C04B 20/10 521/56 |
| 2012/0148806 A1 | 6/2012 | Dubey et al. | |
| 2012/0315464 A1 | 12/2012 | Refouvelet et al. | |
| 2013/0102705 A1 | 4/2013 | Sabio et al. | |
| 2013/0273319 A1 | 10/2013 | Chen et al. | |
| 2018/0002232 A1 | 1/2018 | Creyx et al. | |
| 2019/0077700 A1 | 3/2019 | Xu et al. | |

FOREIGN PATENT DOCUMENTS

| | | |
|---|---|---|
| AU | 748229 | 6/1999 |
| JP | H10139510 A * | 5/1998 |
| WO | WO2004113248 | 12/2004 |
| WO | WO2010149893 | 12/2010 |
| WO | WO2011161384 | 12/2011 |
| WO | WO2012001292 | 1/2012 |
| WO | WO2012089944 | 7/2012 |
| WO | WO2012160319 | 11/2012 |
| WO | WO2012175660 | 12/2012 |
| WO | WO2014096701 | 6/2014 |
| WO | WO2017220935 | 12/2017 |

OTHER PUBLICATIONS

JP H10139510 A English translation (Year: 1998).*

* cited by examiner

*Primary Examiner* — Jeffrey D Washville
(74) *Attorney, Agent, or Firm* — Dority & Manning, P.A.

(57) ABSTRACT

In the present disclosure, a cement board is disclosed. The cement board comprises a core having a first surface and a second surface opposite the first surface and a binder including a pozzolan material and a water-resistant additive, wherein the water-resistant additive is present in an amount of less than 5 wt. % based on the weight of the pozzolan material.

25 Claims, No Drawings

CEMENT BOARD WITH WATER-RESISTANT ADDITIVE

RELATED APPLICATIONS

The present application is a continuation of U.S. patent application Ser. No. 17/155,238 having a filing date of Jan. 22, 2021 which claims filing benefit of U.S. Provisional Patent Application No. 62/965,347 having a filing date of Jan. 24, 2020, which are both hereby incorporated by reference in their entirety.

BACKGROUND

Cement boards are typically utilized in the construction industry for various applications. Commonly used cement boards may have deficiencies regarding their waterproofing capabilities. For instance, water may pass through the board to the other building materials, which can create issues. For example, the penetration of water through a cement board may result in the growth of mold. Certain additives have been utilized. However, these additives may result in the board losing some of its original durability.

As a result, there is a need to further improve the waterproof performance of cement boards while also maintaining its durability.

SUMMARY OF THE INVENTION

In accordance with one embodiment of the present invention, a cement board is disclosed. The cement board comprises a core having a first surface and a second surface opposite the first surface and a binder including a pozzolan material and a water-resistant additive, wherein the water-resistant additive is present in an amount of less than 5 wt. % based on the weight of the pozzolan material.

DETAILED DESCRIPTION

Reference now will be made in detail to embodiments, one or more examples of which are illustrated in the drawings. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a cement board. For instance, the cement board includes a water-resistant additive that allows for an improvement with respect to the waterproof performance. In particular, utilizing a water-resistant additive in the amounts as disclosed herein provides advantages that can be beneficial for the construction industry.

For instance, the present inventors have discovered that liquid water may not penetrate through the board in certain embodiments. Such test was conducted in accordance with ANSI A118.10 and ASTM D4068, Annex A2. For example, when studying the underside of the cement board, it did not appear that water penetrated the board. If water penetrates the board, a change in color can be observed. The change in color will be present within a certain defined area. In this regard, when conducting the test for the cement board as disclosed herein, such area indicative of any water penetration through the cement board may be 3.5 in$^2$ or less, such as 3 in$^2$ or less, such as 2 in$^2$ or less, such as 1.5 in$^2$ or less, such as 1 in$^2$ or less, such as 0.8 in$^2$ or less, such as 0.6 in$^2$ or less, such as 0.4 in$^2$ or less, such as 0.2 in$^2$ or less, such as 0.1 in$^2$ or less, such as 0.05 in$^2$ or less.

The aforementioned test is generally conducted for 48 hours. In this regard, such areas may be realized at 48 hours. However, the present inventors have discovered that water may not penetrate through the cement board even after having conducted the test for longer durations of time. For example, the aforementioned water penetration may be realized at 3 days, at 5 days, at 7 days, at 10 days, at 14 days, at 17 days, at 20 days, at 23 days, at 26 days, and/or at 30 days.

Furthermore, the aforementioned test requires that all three specimens demonstrate no water penetration in order to pass the test. In some embodiments, all three specimens would exhibit no water penetration according to the conditions of the test. In other embodiments, two specimens may not exhibit water penetration. In a further embodiment, at least one specimen may not exhibit water penetration.

In addition to water penetration, the cement board may absorb a minimal amount of water. Such water absorption may be determined in accordance with ASTM C473 (24-hour immersion) and may be less than 8 wt. %, such as 7 wt. % or less, such as 6 wt. % or less, such as 5 wt. % or less, such as 4 wt. % or less, such as 3 wt. % or less, such as 2 wt. % or less, such as 1 wt. % or less.

Even with the reduction in the liquid water penetration and the water absorption, the water vapor permeance may not be negatively affected. In this regard, the water vapor permeance may be determined in accordance with ASTM E 96/E96M-16, Procedure B and may be 5 Perms or more, such as 10 Perms or more, such as 13 Perms or more, such as 15 Perms or more, such as 18 Perms or more, such as 20 Perms or more, such as 22 Perms or more, such as 25 Perms or more. The water vapor permeance may be 50 Perms or less, such as 40 Perms or less, such as 30 Perms or less, such as 25 Perms or less, such as 20 Perms or less, such as 18 Perms or less, such as 15 Perms or less.

Accordingly, the waterproof performance of the cement board as disclosed herein can be desirable for the construction industry. However, even with the improved performance due to the addition of the water-resistant additive, the cement board may also exhibit the desired durability and mechanism performance as further disclosed herein. In this regard, the cement board may pass the required structural certifications for use in a particular application in construction.

Even further, the present inventors have discovered that the cement board as disclosed herein may demonstrate self-healing properties in certain embodiment. For instance, if a crack or defect is present, exposure to any water may result in healing of the cement board. For example, without intending to be limited by theory, the water may allow for hydration and/or reaction of certain components that can allow for healing of the cement board. As an example, some of the components may react to form limestone that can fill the crack or defect. These components may include calcium hydroxide, fly ash, among others. Generally, these components may be those particles or components that have not reacted thereby allowing for the self-healing.

Also, the use of the water-resistant additive as disclosed herein can also provide a board with improved aesthetics. For instance, cement boards containing the additive have been shown to exhibit a reduced amount of efflorescence on the surface. This is particularly noticeable on a top cement board when a plurality of boards are stacked.

As indicated above, in general, the present invention is directed to a cement board. The cement board includes a core. In general, the composition of the core is not necessarily limited and may be any core generally known in the art. Regardless, the core is typically made from a slurry including at least water and a binder.

The cement core also includes a binder. In general, the binder includes a material which is able to set on hydration. Such materials may also be generally referred to as a hydraulic cement. The present invention is not necessarily limited and may include binders generally known in the art. For instance, these may include, but are not limited to, a cement, a pozzolan material, gypsum, or a mixture thereof.

The cement may include any cement as generally known in the art. For instance, the cement may include, but is not limited to, Portland cement, magnesia cement, alumina cement (e.g., calcium aluminate cement), calcium sulphoaluminate cement, or a mixture thereof. In one embodiment, the cement may include at least Portland cement. In another embodiment, the cement may include at least alumina cement. In one embodiment, the binder includes at least two, such as at least three the cements. For example, in one embodiment, the binder may include at least Portland cement and an alumina cement.

The pozzolan material may include any pozzolan material as generally known in the art. For instance, the pozzolan material may include, but is not limited to, fly ash, blast furnace slag, metakaolin, silica fume, microsilica, or a mixture thereof. In one embodiment, the pozzolan material may include fly ash. In another embodiment, the pozzolan material may include blast furnace slag. In a further embodiment, the pozzolan material may include metakaolin. In another further embodiment, the pozzolan material may include silica fume. In an even further embodiment, the pozzolan material may include microsilica. In one embodiment, the binder includes at least two, such as at least three pozzolan materials.

In general, the binder may also include gypsum. When in the core, it may be present as uncalcined gypsum (i.e., calcium sulfate dihydrate). When added to the slurry, it may be added as calcined gypsum (i.e., calcium sulfate hemihydrate). Regardless, when utilized, it may be utilized in generally lower amounts. For example, the gypsum may be present in the core in an amount of 20 wt. % or less, such as 15 wt. % or less, such as 10 wt. % or less, such as 8 wt. % or less, such as 5 wt. % or less, such as 4 wt. % or less, such as 3 wt. % or less, such as 2 wt. % or less, such as 1 wt. % or less, such as 0.5 wt. % or less based on the weight of the core. In one embodiment, the gypsum may be present in an amount of 0 wt. % based on the weight of the core. In addition, it should be understood that the aforementioned weight percentages may also apply to the amount of the gypsum based on the weight of the cement board. Further, it should be understood that the aforementioned weight percentages may also apply to the amount of the gypsum based on the weight of the slurry.

In general, the cement(s) may be present in the core in an amount of 1 wt. % or more, such as 5 wt. % or more, such as 10 wt. % or more, such as 15 wt. % or more, such as 20 wt. % or more, such as 25 wt. % or more, such as 30 wt. % or more, 35 wt. % or more, such as 40 wt. % or more, such as 45 wt. % or more, such as 50 wt. % or more based on the weight of the core. The cement(s) may be present in the core in an amount of less than 100 wt. %, such as 90 wt. % or less, such as 85 wt. % or less, such as 80 wt. % or less, such as 70 wt. % or less, such as 60 wt. % or less, such as 50 wt. % or less, such as 40 wt. % or less, such as 30 wt. % or less, such as 25 wt. % or less, such as 20 wt. % or less based on the weight of the core. In addition, it should be understood that the aforementioned weight percentages may also apply to the amount of the cement(s) based on the weight of the cement board. Further, it should be understood that the aforementioned weight percentages may also apply to the amount of the cement(s) based on the weight of the slurry. In addition, the aforementioned percentages may also apply to a particular species of cement.

In general, the pozzolan material(s) may be present in the core in an amount of 1 wt. % or more, such as 5 wt. % or more, such as 10 wt. % or more, such as 15 wt. % or more, such as 20 wt. % or more, such as 25 wt. % or more, such as 30 wt. % or more, 35 wt. % or more, such as 40 wt. % or more, such as 45 wt. % or more, such as 50 wt. % or more based on the weight of the core. The pozzolan material(s) may be present in the core in an amount of less than 100 wt. %, such as 90 wt. % or less, such as 85 wt. % or less, such as 80 wt. % or less, such as 70 wt. % or less, such as 60 wt. % or less, such as 50 wt. % or less, such as 40 wt. % or less, such as 30 wt. % or less, such as 25 wt. % or less, such as 20 wt. % or less based on the weight of the core. In addition, it should be understood that the aforementioned weight percentages may also apply to the amount of the pozzolan material(s) based on the weight of the cement board. Further, it should be understood that the aforementioned weight percentages may also apply to the amount of the pozzolan material(s) based on the weight of the slurry. In addition, the aforementioned percentages may also apply to a particular species of pozzolan material.

In one embodiment, the binder may include a combination of a cement and a pozzolan material. For instance, the weight ratio of the total weight of the pozzolan materials to the total weight of the pozzolan materials may be 0.01 or more, such as 0.1 or more, such as 0.1 or more, such as 0.2 or more, such as 0.5 or more, such as 0.8 or more, such as 1 or more, such as 1.5 or more, such as 2 or more, such as 2.5 or more, such as 3 or more, such as 4 or more, such as 5 or more. The weight ratio may be 50 or less, such as 40 or less, such as 30 or less, such as 20 or less, such as 15 or less, such as 10 or less, such as 8 or less, such as 6 or less, such as 5 or less, such as 4 or less, such as 3 or less, such as 2.5 or less, such as 2 or less, such as 1.5 or less, such as 1 or less, such as 0.5 or less, such as 0.4 or less.

In general, the binder(s) may be present in the core in an amount of 25 wt. % or more, such as 30 wt. % or more, 35 wt. % or more, such as 40 wt. % or more, such as 45 wt. % or more, such as 50 wt. % or more, such as 55 wt. % or more, such as 60 wt. % or more, such as 65 wt. % or more based on the weight of the core. The binder(s) may be present in the core in an amount of less than 100 wt. %, such as 98 wt. % or less, such as 95 wt. % or less, such as 90 wt. % or less, such as 85 wt. % or less, such as 80 wt. % or less, such as 75 wt. % or less, such as 70 wt. % or less, such as 65 wt. % or less, such as 60 wt. % or less based on the weight of the core. In addition, it should be understood that the aforementioned weight percentages may also apply to the amount of the binder(s) based on the weight of the cement board. Further, it should be understood that the aforementioned weight percentages may also apply to the amount of the binder(s) based on the weight of the slurry.

The cement core may also include aggregates. For instance, the aggregates may include normal weight aggregates, lightweight aggregates, or a mixture thereof. In one embodiment, the cement core includes normal weight aggregates. In a further embodiment, the cement core includes lightweight aggregates. In an even further embodiment, the cement core includes a mixture of normal weight aggregates and lightweight aggregates. However, in addition to the above, it should be understood that the aggregates may also include heavy weight aggregates.

In general, normal weight aggregate may have a density of 1,100 kg/m$^3$ or more, such as 1,300 kg/m$^3$ or more, such as 1,500 kg/m$^3$ or more to 2,100 kg/m$^3$ or less, such as 2,000 kg/m$^3$ or less, such as 1,800 kg/m$^3$ or less, such as 1,600 kg/m$^3$ or less. Meanwhile, lightweight aggregate may have a density of less than 1,100 kg/m$^3$, such as 1,000 kg/m$^3$ or less, such as 900 kg/m$^3$ or less, such as 800 kg/m$^3$ or less, such as 700 kg/m$^3$ or less, such as 600 kg/m$^3$ or less. In addition, heavy weight aggregate may have a density of greater than 2,100 kg/m$^3$.

In general, the normal weight aggregate may include any normal weight aggregate as generally known in the art. For instance, the normal weight aggregate may include, but is not limited to, sand, stone (e.g., crushed stone), limestone, shale, clay, recycled concrete, granite or other minerals, and the like, or a mixture thereof. In one embodiment, the normal weight aggregate includes sand (e.g., mortar grade sand). In another embodiment, the normal weight aggregate includes stone. In a further embodiment, the normal weight aggregate includes limestone. In an even further embodiment, the normal weight aggregate includes granite. In one embodiment, the normal weight aggregate includes at least two, such as at least three, such as at least four normal weight aggregates.

In general, the lightweight aggregate may include a material having a cellular or internal porous microstructures. For instance, the lightweight aggregate may include, but is not limited to, expanded shale, clay (e.g., expanded clay), foamed slag, sintered fly ash, vermiculite (e.g., expanded vermiculite), perlite (e.g., expanded perlite), pumice (e.g., expanded pumice), expanded glass (e.g., expanded closed-cell glass beads), polystyrene (e.g., expanded polystyrene beads, expanded or unexpanded closed-cell polystyrene beads), polyurethane, hollow spheres (e.g., ceramic hollow spheres, glass hollow spheres, plastic hollow spheres, geopolymer hollow spheres, fly ash hollow spheres, silicate hollow spheres, or a mixture there), and the like, or a mixture thereof. In one embodiment, the lightweight aggregate includes polystyrene. In another embodiment, the lightweight aggregate includes expanded glass. In a further embodiment, the lightweight aggregate includes hollow spheres. In one embodiment, the lightweight aggregate includes at least two, such as at least three, such as at least four lightweight aggregates.

As indicated above, in one embodiment, the lightweight aggregate includes polystyrene. For instance, the polystyrene may include polystyrene beads, such as closed-cell polystyrene beads. Such polystyrene beads may be expanded polystyrene beads. The expanded polystyrene beads may have a particular size distribution. For instance, when taking into account all of the expanded beads, the average diameter of the expanded polystyrene beads may be 0.01 inches or more, such as 0.015 inches or more, such as 0.02 inches or more, such as 0.03 inches or more, such as 0.04 inches or more, such as 0.05 inches or more, such as 0.06 inches or more, such as 0.07 inches or more, such as 0.08 inches or more, such as 0.09 inches or more, such as 0.1 inches or more, such as 0.11 inches or more, such as 0.12 inches or more, such as 0.13 inches or more, such as 0.14 inches or more, such as 0.15 inches or more. The dimeter may be 0.5 inches or less, such as 0.4 inches or less, such as 0.3 inches or less, such as 0.25 inches or less, such as 0.2 inches or less, such as 0.18 inches or less, such as 0.15 inches or less, such as 0.13 inches or less, such as 0.12 inches or less, such as 0.11 inches or less, such as 0.1 inches or less, such as 0.09 inches or less, such as 0.08 inches or less, such as 0.07 inches or less, such as 0.06 inches or less, such as 0.05 inches or less, such as 0.04 inches or less, such as 0.03 inches or less, such as 0.02 inches or less.

In one embodiment, the expanded polystyrene beads may have a unimodal size distribution wherein the average diameter is within the aforementioned range. In another embodiment, the expanded polystyrene beads may have a bimodal size distribution. For instance, a first set of expanded polystyrene beads may have an average diameter less than a second set of expanded polystyrene beads. The first set of expanded polystyrene beads may have an average diameter within the aforementioned range. Also, the second set of expanded polystyrene beads may also have an average diameter within the aforementioned range. Regardless, the first set has an average diameter less than the second set. Furthermore, the first set having an average diameter less than the second set may be present in an amount of 10 wt. % or more, such as 15 wt. % or more, such as 20 wt. % or more, such as 25 wt. % or more, such as 30 wt. % or more, such as 35 wt. % or more, such as 40 wt. % or more, such as 45 wt. % or more, such as 50 wt. % or more to less than 100 wt. %, such as 90 wt. % or less, such as 80 wt. % or less, such as 70 wt. % or less, such as 60 wt. % or less, such as 50 wt. % or less based on the total weight of the expanded polystyrene beads. In this regard, the balance may be occupied by the second set of expanded polystyrene beads.

The polystyrene beads and means for expanding are further described in U.S. Pat. No. 9,499,980, which is hereby incorporated by reference in its entirety.

The composition of the aggregates is not generally limited by the present invention. It should be understood by a person skilled in the art that the composition may at least be partially dictated by the desired density of the cement board. For example, the aggregates and concentrations thereof may be selected based on the desired density of the cement board.

In general, the aggregate(s) may be present in the core in an amount of 0.1 wt. % or more, such as 0.3 wt. % or more, such as 0.5 wt. % or more, such as 1 wt. % or more, such as 2 wt. % or more, such as 5 wt. % or more, such as 10 wt. % or more, such as 15 wt. % or more, such as 20 wt. % or more, such as 25 wt. % or more, such as 30 wt. % or more based on the weight of the core. The aggregate(s) may be present in the core in an amount of 50 wt. % or less, such as 45 wt. % or less, such as 40 wt. % or less, such as 35 wt. % or less, such as 30 wt. % or less, such as 25 wt. % or less, such as 20 wt. % or less, such as 15 wt. % or less, such as 10 wt. % or less, such as 8 wt. % or less, such as 5 wt. % or less, such as 4 wt. % or less, such as 3 wt. % or less, such as 2 wt. % or less based on the weight of the core. In addition, it should be understood that the aforementioned weight percentages may also apply to the amount of the aggregate(s) based on the weight of the cement board. Further, it should be understood that the aforementioned weight percentages may also apply to the amount of the aggregate(s) based on the weight of the slurry. In addition, the aforementioned percentages may also apply to a particular species of aggregate.

Also, it should be understood that the aforementioned weight percentages may apply individually to the normal weight aggregates. Furthermore, it should be understood that the aforementioned weight percentages may apply individually to the lightweight aggregates. When both a normal weight aggregate and a lightweight aggregate are utilized, they may be present within a specific weight ratio. For instance, the weight ratio of the normal weight aggregate to the lightweight aggregate may be 0.01 or more, such as 0.05 or more, such as 0.1 or more, such as 0.2 or more, such as 0.3 or more, such as 0.5 or more, such as 1 or more. The weight ratio may be 20 or less, such as 15 or less, such as 10 or less, such as 8 or less, such as 6 or less, such as 4 or less, such as 2 or less, such as 1.5 or less, such as 1 or less, such as 0.8 or less, such as 0.6 or less, such as 0.5 or less.

The cement core may also include a chemical set admixture. For instance, the chemical set admixture may be utilized to alter the hydration or properties of the slurry. For instance, such admixture may include a retarder, an accelerator, and the like, or a mixture thereof. In one embodiment, the admixture may include at least a retarder. In another embodiment, the admixture may include at least an accelerator.

In general, the chemical set admixture may include, but is not limited to, lithium salts (e.g., lithium carbonate), sodium tripolyphostate, alkanolamines (e.g., triethanolamine), nitrites (e.g., calcium nitrite, sodium nitrite, etc.) calcium formate, sulfates (e.g., aluminum sulfate, sodium sulfate, calcium sulfate), sodium carbonate, calcium chloride, silicates (e.g., magnesium fluorosilicate, sodium silicate), calcium hydroxide, calcium-aluminate cement, boric acid, borax, formic acid, citric acid, sodium citrate, sodium gluconate, glucose, sucrose, fructose, or a mixture thereof. In one embodiment, the admixture may include a nitrite. In another embodiment, the admixture may include a sulfate. In a further embodiment, the admixture may include citric acid. In an even further embodiment, the admixture may include a sodium citrate. In one embodiment, the admixture includes at least two, such as at least three, such as at least four components.

In general, the chemical set admixture(s) may be present in the core in an amount of 0 wt. % or more, such as 0.0001 wt. % or more, such as 0.001 wt. % or more, such as 0.01 wt. % or more, such as 0.1 wt. % or more, such as 0.2 wt. % or more, such as 0.5 wt. % or more, such as 1 wt. % or more, such as 1.5 wt. % or more, such as 2 wt. % or more, such as 2.5 wt. % or more, such as 3 wt. % or more, such as 5 wt. % or more based on the weight of the core. The chemical set admixture(s) may be present in the core in an amount of 20 wt. % or less, such as 15 wt. % or less, such as 13 wt. % or less, such as 10 wt. % or less, such as 9 wt. % or less, such as 8 wt. % or less, such as 6 wt. % or less, such as 5 wt. % or less, such as 4 wt. % or less, such as 3 wt. % or less, such as 2.5 wt. % or less, such as 2 wt. % or less, such as 1.5 wt. % or less, such as 1 wt. % or less, such as 0.5 wt. % or less, such as 0.3 wt. % or less, such as 0.1 wt. % or less based on the weight of the core. In addition, it should be understood that the aforementioned weight percentages may also apply to the amount of the chemical set admixture(s) based on the weight of the cement board. Further, it should be understood that the aforementioned weight percentages may also apply to the amount of the chemical set admixture(s) based on the weight of the slurry. In addition, the aforementioned percentages may also apply to a particular species within the chemical set admixture.

The cement core may also include a rheological admixture. For instance, the rheological admixture may be utilized to alter the water reduction or rheology of the slurry.

In general, the rheological admixture may include, but is not limited to, sulfonates (e.g., melamine sulfonate, sodium naphthalene sulfonate, lignosulfonates, etc.), cellulose polymer derivatives (e.g., ethyl cellulose, hydroxypropyl methyl cellulose, hydroxyethyl cellulose, etc.), hydrophobically modified alkali swellable emulsions or hydrophobically modified ethoxylate urethanes, molecular rheology modifiers, polysaccharides (e.g., Wellan gum, xantham gum, etc.), galactomannans (e.g., guar gum, carob gum, etc.), and the like, or a mixture thereof. In one embodiment, the admixture may include a sulfonate. In another embodiment, the admixture may include a cellulose polymer derivative. In a further embodiment, the admixture may include a polysaccharide. In one embodiment, the admixture includes at least two, such as at least three, such as at least four components.

In general, the rheological admixture(s) may be present in the core in an amount of 0 wt. % or more, such as 0.1 wt. % or more, such as 0.2 wt. % or more, such as 0.5 wt. % or more, such as 1 wt. % or more, such as 1.5 wt. % or more, such as 2 wt. % or more, such as 2.5 wt. % or more, such as 3 wt. % or more, such as 5 wt. % or more based on the weight of the core. The rheological admixture(s) may be present in the core in an amount of 10 wt. % or less, such as 8 wt. % or less, such as 6 wt. % or less, such as 6 wt. % or less, such as 5 wt. % or less, such as 4 wt. % or less, such as 3 wt. % or less, such as 2.5 wt. % or less, such as 2 wt. % or less, such as 1.75 wt. % or less, such as 1.5 wt. % or less, such as 1 wt. % or less, such as 0.8 wt. % or less based on the weight of the core. In addition, it should be understood that the aforementioned weight percentages may also apply to the amount of the rheological admixture(s) based on the weight of the cement board. Further, it should be understood that the aforementioned weight percentages may also apply to the amount of the rheological admixture(s) based on the weight of the slurry. In addition, the aforementioned percentages may also apply to a particular species within the rheological admixture.

The cement core may also include a surfactant. For instance, the surfactant may include those as generally known in the art. In general, the surfactant may have an HLB value of 5 or more, such as 8 or more, such as 10 or more, such as 12 or more, such as 15 or more, such as 18 or more. The HLB value may be 25 or less, such as 20 or less, such as 18 or less, such as 15 or less, such as 13 or less, such as 10 or less.

The surfactant may include a nonionic surfactant, an anionic surfactant, a cationic surfactant, or a mixture thereof. In one embodiment, the surfactant may include at least an anionic surfactant. In another embodiment, the surfactant may include at least a nonionic surfactant. In a further embodiment, the surfactant may include at least a cationic surfactant. In one particular embodiment, the surfactant may include a combination of an anionic surfactant and a nonionic surfactant.

As indicated above, in one embodiment, the surfactant may include an anionic surfactant. In general, anionic surfactants include those having one or more negatively charged functional groups. For instance, the anionic surfactant includes alkali metal or ammonium salts of alkyl, aryl or alkylaryl sulfonates, sulfates, phosphates. For instance, the anionic surfactant may include sodium lauryl sulfate, sodium octylphenol glycolether sulfate, sodium dodecylbenzene sulfonate, sodium lauryldiglycol sulfate, ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, alpha olefin sulfonate, and mixtures thereof. Other examples include a $C_8$-$C_{22}$ alkyl fatty acid salt of an alkali metal, alkaline earth metal, ammonium, alkyl substituted ammonium, for example, isopropylamine salt, or alkanolammonium salt, a $C_8$-$C_{22}$ alkyl fatty acid ester, a $C_8$-$C_{22}$ alkyl fatty acid ester salt, and alkyl ether carboxylates.

In one particular embodiment, the anionic surfactant includes a water-soluble salt, particularly an alkali metal salt, of an organic sulfur reaction product having in their molecular structure an alkyl radical containing from about 8 to 22 carbon atoms and a radical selected from the group consisting of sulfonic and sulfuric acid ester radicals. Organic sulfur based anionic surfactants include the salts of $C_{10}$-$C_{16}$ alkylbenzene sulfonates, $C_{10}$-$C_{22}$ alkane sulfonates, $C_{10}$-$C_{22}$ alkyl ether sulfates, $C_{10}$-$C_{22}$ alkyl sulfates, $C_4$-$C_{10}$ dialkylsulfosuccinates, $C_{10}$-$C_{22}$ acyl isothionates, alkyl diphenyloxide sulfonates, alkyl naphthalene sulfonates, $C_{10}$-$C_{20}$ alpha olefin sulfonates, and 2-acetamido hexadecane sulfonates. Organic phosphate based anionic surfactants include organic phosphate esters such as complex mono- or diester phosphates of hydroxyl-terminated alkoxide condensates, or salts thereof. Included in the organic phosphate esters are phosphate ester derivatives of polyoxyalkylated alkylaryl phosphate esters, of ethoxylated linear alcohols and ethoxylates of phenol. Particular examples of anionic surfactants include a polyoxyethylene alkyl ether sulfuric ester salt, a polyoxyethylene alkylphenyl ether sulfuric ester salt, polyoxyethylene styrenated alkylether ammonium sulfate, polyoxymethylene alkylphenyl ether ammonium sulfate, and the like, and mixtures thereof. For instance, the anionic surfactant may include a polyoxyethylene alkyl ether sulfuric ester salt, a polyoxyethylene alkylphenyl ether sulfuric ester salt, or a mixture thereof.

As indicated above, in one embodiment, the surfactant may include a non-ionic surfactant. The non-ionic surfactant may be generally as known in the art. Generally, nonionic surfactants include, but are not limited to, amine oxides, fatty acid amides, ethoxylates (e.g., ethoxylated fatty acids, ethoxylated fatty alcohols, etc.), block copolymers of polyethylene glycol and polypropylene glycol, glycerol alkyl esters, alkyl polyglucosides, polyoxyethylene glycol octylphenol ethers, sorbitan alkyl esters, polyoxyethylene glycol sorbitan alkyl esters, and mixtures thereof. For instance, the non-ionic surfactant may include a polyethylene oxide condensate of an alkyl phenol (e.g., the condensation product of an alkyl phenol having an alkyl group containing from 6 to 12 carbon atoms in either a straight chain or branched chain configuration, with ethylene oxide (e.g., present in amounts equal to 1 to 40 moles)). The alkyl substituent may be derived, for example, from polymerized propylene, di-isobutylene, octane or nonene. Other examples include dodecylphenol condensed with 12 moles of ethylene oxide per mole of phenol; dinonylphenol condensed with 5 moles of ethylene oxide per mole of phenol; nonylphenol condensed with 9 moles of ethylene oxide per mole of nonylphenol and di-iso-octylphenol condensed with 5 moles of ethylene oxide. The non-ionic surfactant may be a condensation product of a primary or secondary aliphatic alcohol having from 8 to 24 carbon atoms, in either straight chain or branched chain configuration, with from 1 to about 40 moles of alkylene oxide per mole of alcohol. The non-ionic surfactant may include a compound formed by condensing ethylene oxide with a hydrophobic base formed by the condensation of propylene oxide with propylene glycol (e.g., Pluronics).

As indicated above, in one embodiment, the surfactant may include a cationic surfactant. Examples of the cationic surfactant may include water-soluble quaternary ammonium compounds, polyammonium salts, a polyoxyethylene alkylamine and the like.

In general, the surfactant(s) may be present in the core in an amount of 0 wt. % or more, such as 0.0001 wt. % or more, such as 0.0005 wt. % or more, such as 0.001 wt. % or more, such as 0.005 wt. % or more, such as 0.01 wt. % or more, such as 0.05 wt. % or more, such as 0.1 wt. % or more based on the weight of the core. The surfactant(s) may be present in the core in an amount of 5 wt. % or less, such as 4 wt. % or less, such as 3 wt. % or less, such as 2 wt. % or less, such as 1 wt. % or less, such as 0.8 wt. % or less, such as 0.5 wt. % or less, such as 0.3 wt. % or less, such as 0.2 wt. % or less, such as 0.15 wt. % or less, such as 0.1 wt. % or less, such as 0.08 wt. % or less, such as 0.05 wt. % or less, such as 0.03 wt. % or less, such as 0.01 wt. % or less, such as 0.005 wt. % or less, such as 0.001 wt. % or less based on the weight of the core. In one embodiment, a surfactant may not be utilized such that the weight percentage is 0. In addition, it should be understood that the aforementioned weight percentages may also apply to the amount of the surfactant(s) based on the weight of the cement board. Further, it should be understood that the aforementioned weight percentages may also apply to the amount of the surfactant(s) based on the weight of the slurry.

As indicated above, the cement board and cement core also include a water-resistant additive. In general, the water-resistant additive assists with prohibiting or minimizing the water transfer (e.g., liquid and/or vapor) through the cement board.

For example, the water-resistant additive in general may include a fatty acid component. Suitable fatty acids typically have a backbone carbon chain of from about 12 to about 60 carbon atoms. For example, the chain may have 12 or more, such as 14 or more, such as 16 or more, such as 18 or more, such as 20 or more carbon atoms. The chain may have 60 or less, such as 50 or less, such as 40 or less, such as 30 or less, such as 26 or less, such as 24 or less, such as 22 or less, such as 20 or less carbon atoms. The fatty acid may include, but is not limited to, myristic acid, palmitic acid, stearic acid, arachidonic acid, montanic acid, octadecanoic acid, parinaric acid, etc. The fatty acid may be saturated in one embodiment. In another embodiment, the fatty acid may be unsaturated.

Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable as the water-resistant additive are hydrocarbon waxes, including paraffin waxes, polyolefin and oxidized polyolefin waxes, and microcrystalline waxes. Also suitable are the metal salts of fatty acids. These salts may include an alkali metal, an alkaline earth metal, a transition metal, etc. In particular, these metals may include, but are not limited to calcium, zinc, magnesium, aluminum, etc. For example, in one embodiment, the water-resistant additive may include a stearate, such as calcium stearate, zinc stearate, magnesium stearate, or a mixture thereof. In one particular embodiment, the water-resistant additive includes at least calcium stearate. In another particular embodiment, the water-resistant additive includes at least zinc stearate.

In general, the water-resistant additive(s) may be present in the core in an amount of more than 0 wt. %, such as 0.0001 wt. % or more, such as 0.0005 wt. % or more, such as 0.001 wt. % or more, such as 0.005 wt. % or more, such as 0.01 wt. % or more, such as 0.05 wt. % or more, such as 0.1 wt. % or more, such as 0.3 wt. % or more, such as 0.5 wt. % wt. % or more, such as 0.8 wt. % or more, such as 1 wt. % or more based on the weight of the core. The water-resistant additive(s) may be present in the core in an amount of 5 wt. % or less, such as 4 wt. % or less, such as 3 wt. % or less, such as 2 wt. % or less, such as 1 wt. % or less, such as 0.8 wt. % or less, such as 0.5 wt. % or less, such as 0.3 wt. % or less, such as 0.2 wt. % or less, such as 0.15 wt. % or less, such as 0.1 wt. % or less, such as 0.08 wt. % or less, such as 0.05 wt. % or less, such as 0.03 wt. % or less, such as 0.01 wt. % or less, such as 0.005 wt. % or less, such as 0.001 wt. % or less based on the weight of the core. In addition, it should be understood that the aforementioned weight percentages may also apply to the amount of the water-resistant additive(s) based on the weight of the cement board. Further, it should be understood that the aforementioned weight percentages may also apply to the amount of the water-resistant additive(s) based on the weight of the slurry. In addition, the aforementioned percentages may also apply to a particular species of water-resistant additive.

Furthermore, the water-resistant additive(s) may be present in the core in an amount of more than 0 wt. %, such as 0.0001 wt. % or more, such as 0.0005 wt. % or more, such as 0.001 wt. % or more, such as 0.005 wt. % or more, such as 0.01 wt. % or more, such as 0.05 wt. % or more, such as 0.1 wt. % or more, such as 0.3 wt. % or more, such as 0.5 wt. % wt. % or more, such as 0.8 wt. % or more, such as 1 wt. % or more based on the weight of the pozzolan material. The water-resistant additive(s) may be present in the core in an amount of less than 5 wt. %, such as 4 wt. % or less, such as 3 wt. % or less, such as 2 wt. % or less, such as 1 wt. % or less, such as 0.8 wt. % or less, such as 0.5 wt. % or less, such as 0.3 wt. % or less, such as 0.2 wt. % or less, such as 0.15 wt. % or less, such as 0.1 wt. % or less, such as 0.08 wt. % or less, such as 0.05 wt. % or less, such as 0.03 wt. % or less, such as 0.01 wt. % or less, such as 0.005 wt. % or less, such as 0.001 wt. % or less based on the weight of the pozzolan material.

In addition, the water-resistant additive(s) may be present in the core in an amount of more than 0 wt. %, such as 0.0001 wt. % or more, such as 0.0005 wt. % or more, such as 0.001 wt. % or more, such as 0.005 wt. % or more, such as 0.01 wt. % or more, such as 0.05 wt. % or more, such as 0.1 wt. % or more, such as 0.3 wt. % or more, such as 0.5 wt. % wt. % or more, such as 0.8 wt. % or more, such as 1 wt. % or more, such as 1.5 wt. % or more, such as 2 wt. % or more, such as 2.5 wt. % or more, such as 3 wt. % or more, such as 4 wt. % or more, such as 5 wt. % or more, such as 6 wt. % or more, such as 8 wt. % or more, such as 10 wt. % or more based on the weight of any normal weight aggregates, such as sand. The water-resistant additive(s) may be present in the core in an amount of 20 wt. % or less, such as 15 wt. % or less, such as 10 wt. % or less, such as 9 wt. % or less, such as 8 wt. % or less, such as 7 wt. % or less, such as 5 wt. % or less, such as 3 wt. % or less, such as 2.5 wt. % or less, such as 1 wt. % or less, such as 1.5 wt. % or less, such as 1 wt. % or less, such as 0.8 wt. % or less, such as 0.5 wt. % or less based on the weight of any normal weight aggregates, such as sand.

Also, the water-resistant additive(s) may be present in the core in an amount of more than 0 wt. %, such as 1 wt. % or more, such as 2 wt. % or more, such as 5 wt. % or more, such as 10 wt. % or more, such as 15 wt. % or more, such as 20 wt. % or more, such as 25 wt. % or more, such as 30 wt. % or more, such as 40 wt. % or more, such as 50 wt. % or more, such as 60 wt. % or more, such as 70 wt. % or more, such as 80 wt. % or more, such as 90 wt. % or more, such as 100 wt. % or more, such as 125 wt. % or more, such as 150 wt. % or more, such as 200 wt. % or more based on the weight of any lightweight aggregates, such as expanded polystyrene. The water-resistant additive(s) may be present in the core in an amount of 500 wt. % or less, such as 400 wt. % or less, such as 300 wt. % or less, such as 200 wt. % or less, such as 175 wt. % or less, such as 150 wt. % or less, such as 120 wt. % or less, such as 100 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 25 wt. % or less, such as 20 wt. % or less, such as 10 wt. % or less based on the weight of any lightweight aggregates, such as expanded polystyrene.

The slurry utilized in making the cement board also includes water. Water may be employed for fluidity and also for rehydration of the stucco to allow for setting. The amount of water utilized is not necessarily limited by the present invention.

The water may be present in the slurry in an amount of 1 wt. % or more, such as 3 wt. % or more, such as 5 wt. % or more, such as 7 wt. % or more, such as 9 wt. % or more, such as 10 wt. % or more, such as 13 wt. % or more, such as 15 wt. % or more based on the weight of the slurry. The water may be present in the slurry in an amount of 40 wt. % or less, such as 30 wt. % or less, such as 25 wt. % or less, such as 20 wt. % or less, such as 15 wt. % or less, such as 10 wt. % or less based on the weight of the slurry.

For instance, the weight ratio of the water to the binders in the slurry may be 0.001 or more, such as 0.01 or more, such as 0.05 or more, such as 0.1 or more, such as 0.13 or more, such as 0.15 or more, such as 0.17 or more, such as 0.2 or more, such as 0.3 or more, such as 0.5 or more. The weight ratio of the water to the binders in the slurry may be 2 or less, such as 1.5 or less, such as 1.3 or less, such as 1 or less, such as 0.8 or less, such as 0.6 or less, such as 0.5 or less, such as 0.4 or less, such as 0.3 or less, such as 0.25 or less, such as 0.2 or less, such as 0.15 or less.

In addition, the slurry may have a particular pH. For instance, the slurry may be basic or alkaline. In this regard, the pH may be more than 7, such as 8 or more, such as 9 or more, such as 10 or more, such as 11 or more, such as 11.5 or more, such as 12 or more, such as 12.5 or more. The pH may be 14 or less, such as 13.5 or less, such as 13 or less.

In addition to the binders and water, the slurry may also include any other conventional additives as known in the art. Accordingly, these conventional additives may also be present in the core and board. In this regard, such additives are not necessarily limited by the present invention. For instance, the additives may include dispersants, foam or foaming agents, biocides (such as bactericides and/or fungicides), adhesives, pH adjusters, leveling agents, non-leveling agents, starches (such as pregelatinized starch, non-pregelatinized starch, and/or an acid modified starch), colorants, fire retardants, fillers (e.g., fibers), etc.

For example, in one embodiment, the additives may include fibers. The fibers may include natural fibers, synthetic fibers, or a mixture thereof. In one embodiment, the fibers may include naturals fibers. In another embodiment, the fibers may include synthetic fibers. In a further embodiment, the fibers may include a mixture of natural fibers and synthetic fibers. The fibers are not necessarily limited and may include those generally utilized in the art. The fibers may include, but are not limited to, cellulose, hemp, cotton, basalt, polyester, polypropylene, polyvinyl alcohol, nylon, alkali resistant glass, carbon, glass, etc., or a mixture thereof. In one embodiment, the fibers may include cellulose. In another embodiment, the fibers may include glass. In a further embodiment, the fibers may include polypropylene. In an even further embodiment, the fibers may include nylon.

In general, it should be understood that the types and amounts of such additives are not necessarily limited by the present invention. When present, each additive may be present in the slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the core The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the core. In addition, it should be understood that the aforementioned weight percentages may also apply to the amount of the additive(s) based on the weight of the cement board. Further, it should be understood that the aforementioned weight percentages may also apply to the amount of the additive(s) based on the weight of the slurry.

In general, the core has a first surface and a second surface opposite the first surface. The cement board may also include a facing material, for example on a surface thereof. In this regard, the cement board may include any facing material as generally known in the art. In one embodiment, the facing material may be disposed directly on the surface. Also, in one embodiment, the facing material may be provided with an adhesive between the facing material and the core. In one embodiment, the facing material may be provided such that it is embedded at least to a certain degree within the core. Accordingly, for embedding the facing material, it may have openings sufficiently large to permit penetration of the slurry into and through the openings, which can permit bonding (e.g., mechanical bonding) of the facing material to the core. The facing material may be embedded a depth such that it is not visible. However, the pattern it creates on a surface may be slightly visible. For instance, the facing material may be embedded at a depth of about 0.1 mm or more, such as 0.2 mm or more, such as 0.3 mm or more, such as 0.4 mm or more, such as 0.5 mm or more, such as 0.8 mm or more, such as 1 mm or more. The depth may be 5 mm or less, such as 4 mm or less, such as 3 mm or less, such as 2 mm or less, such as 1.5 mm or less, such as 1.3 mm or less, such as 1 mm or less, such as 0.8 mm or less, such as 0.6 mm or less, such as 0.5 mm or less, such as 0.4 mm or less. The facing material may be embedded by applying a vibration to the slurry such that it can assist in the creation of a strong bond between the facing material and the slurry.

The facing material as described herein may be any facing material as generally employed in the art. For instance, the facing material may be a paper or cellulosic facing material, a fibrous (e.g., glass fiber) mat facing material, a mesh facing material, or a polymeric facing material. In one embodiment, the facing material is a mesh facing material. For instance, the mesh facing material may be a glass mesh facing material.

It should be understood that the facing materials employed in the cement board may be all of the same type of material. Alternatively, it should also be understood that the facing materials employed in the cement board may be of different types of materials.

The thickness of the facing material is not necessarily limited. For instance, the facing material may have a thickness of 0.01 mm or more, such as 0.05 mm or more, such as 0.1 mm or more, such as 0.2 mm or more, such as 0.25 mm or more, such as 0.3 mm or more, such as 0.5 mm or more, such as 1 mm or more, such as 2 mm or more, such as 3 mm or more, such as 5 mm or more, such as 7 mm or more, such as 9 mm or more, such as 10 mm or more. The facing material may have a thickness of 50 mm or less, such as 40 mm or less, such as 30 mm or less, such as 25 mm or less, such as 20 mm or less, such as 18 mm or less, such as 15 mm or less, such as 14 mm or less, such as 13 mm or less, such as 12 mm or less, such as 11 mm or less, such as 10 mm or less, such as 9 mm or less, such as 8 mm or less, such as 7 mm or less, such as 6 mm or less, such as 5 mm or less, such as 4 mm or less, such as 3 mm or less, such as 2 mm or less, such as 1 mm or less, such as 0.8 mm or less, such as 0.6 mm or less, such as 0.5 mm or less, such as 0.4 mm or less, such as 0.3 mm or less, such as 0.2 mm or less.

The present invention is also directed to a method of making a cement board. The method may include a step of combining water and at least one binder. The method may also include combining any of the other aforementioned additives to form the slurry.

The manner in which the additives are combined is not necessarily limited. For instance, the slurry can be made using any method or device generally known in the art. In particular, the components of the slurry can be mixed or combined using any method or device generally known in the art. For instance, the components of the slurry may be combined in any type of device, such as a mixer and in particular a pin mixer.

As indicated above, the facing material may be provided on either or both sides of the core. In this regard, in one embodiment, the facing material may be provided prior to deposition of the slurry. For instance, the method may include a step of depositing the slurry onto a facing material. For instance, the facing material may be conveyed on a conveyor system (i.e., a continuous system for continuous manufacture of cement board). In this regard, the slurry may be directly deposited onto the facing material. Next, after depositing the slurry, a facing material may be provided on top of the slurry such that the slurry is sandwiched between the facing materials in order to form the cement board. When the facing materials are provided, they may be provided in such a manner as to provide a reinforced edge. For example, they may be provided such that the facing material covering one surface of the cement core wraps around a side edge so as to at least partially, and in one embodiment not completely, cover the facing material on the opposite side of the core. Without intending to be limited by theory, such wrap-around may augment the strength of the cement board at the border edge regions thereby allowing the board to retain sufficient structural integrity when a fastener, such as a screw or nail, is installed near the edge.

In addition or alternatively, edge strips may be utilized as disclosed at least in U.S. Pat. No. 9,499,980, which is hereby incorporated by reference in its entirety. For instance, edge strips may generally have a U-shaped configuration and adhere to respective marginal areas. The edge strips may be adhered to the longitudinal edge face, merely abut the longitudinal edge face or be spaced apart from the longitudinal face. The edge strip may, for example take on a U-shaped configuration as discussed herein. Alternatively, if desired, the longitudinal edge face or a part thereof may be open (i.e. not covered by an edge strip). In this latter case, one or both of the marginal areas adjacent a longitudinal edge on opposite broad or major faces may be provided with an edge reinforcing member.

The edge strips may be made of the same material as the facing materials disclosed therein. In one embodiment, the edge strips may be woven. For instance, the edge strips may be a mesh. In another embodiment, the edge strips may be non-woven. For instance, the edge strips may be a mat. Regardless, examples of materials may include glass, steel, polyester, aramid resin, polyolefin, nylon fibers, polyvinylidene fluoride, polytetrafluoroethylene, cellulosics, and the like. In one particular embodiment, the material may be a polyester or a polyolefin. For example, the material may be a polyester (e.g., poly(ethylene terephthalate). Alternatively, the material may be a polyolefin (e.g., polyethylene, polypropylene, etc.). Regardless, the edge strips may be made of a material allowing for relatively tight interstices such that it is generally impervious to the slurry.

The edge strips may be applied and bonded in any manner utilized in the art. For example, the edge strips may be applied utilizing an adhesive. In one embodiment, the edge strips may be applied such that they are on the exterior of the cement board. For example, they may be placed on the cement board after providing the facing materials.

Regardless of the configuration, after deposition of the slurry, the binder(s) reacts with the water to convert or set the binder(s). Such reaction may allow for the cement to set and become firm thereby allowing for the continuous sheet to be cut into cement boards at the desired length. In this regard, the method may comprise a step of reacting the binder(s) with water or allowing the binder(s) to convert or hydrate. In this regard, the method may allow for the slurry to set to form a cement board.

The method may also comprise a step of cutting a continuous cement board sheet into a cement board. Then, after the cutting step, the method may comprise a step of supplying the cement board to a heating device. For instance, such heating device may be a kiln and may allow for removal of any free water. The temperature and time required for heating in such heating device are not necessarily limited by the present invention.

While the above generally discloses a method for making a cement board, it should be understood that such general method is disclosed in the art. For instance, general methods are disclosed at least in U.S. Pat. No. 9,499,980, which is hereby incorporated by reference in its entirety.

The thickness of the cement board, and in particular, the core, is not necessarily limited and may be from about 0.25 inches to about 1 inch. For instance, the thickness may be at least ¼ inches, such as at least 5/16 inches, such as at least ⅜ inches, such as at least 7/16 inches, such as at least ½ inches, such as at least ⅝ inches, such as at least ¾ inches, such as at least 1 inch, such as at least 1.5 inches, such as at least 2 inches. In this regard, the thickness may be about any one of the aforementioned values. For instance, the thickness may be about ¼ inches. Alternatively, the thickness may be about ⅜ inches. In one embodiment, the thickness may be about 7/16 inches. In another embodiment, the thickness may be about ½ inches. In a further embodiment, the thickness may be about ⅝ inches. In another embodiment, the thickness may be about ¾ inches. In another further embodiment, thickness may be about 1 inch. With regard to the thickness, the term "about" may be defined as within 5%, such as within 4%, such as within 3%, such as within 2%, such as within 1%.

In addition, the weight of the cement board is not necessarily limited. For instance, the cement board may have a weight of 0.5 lbs/ft$^2$ or more, such as 1 lb/ft$^2$ or more, such as 1.3 lbs/ft$^2$ or more, such as 1.5 lbs/ft$^2$ or more, such as 1.8 lbs/ft$^2$ or more, such as 2 lbs/ft$^2$ or more, such as 2.3 lbs/ft$^2$ or more, such as 2.5 lbs/ft$^2$ or more, such as 2.8 lbs/ft$^2$ or more, such as 3 lbs/ft$^2$ or more, such as 3.3 lbs/ft$^2$ or more, such as 3.5 lbs/ft$^2$ or more, such as 3.8 lbs/ft$^2$ or more, such as 4 lbs/ft$^2$ or more. The weight may be 6 lbs/ft$^2$ or less, such as 5.5 lbs/ft$^2$ or less, such as 5 lbs/ft$^2$ or less, such as 4.8 lbs/ft$^2$ or less, such as 4.5 lbs/ft$^2$ or less, such as 4.3 lbs/ft$^2$ or less, such as 4 lbs/ft$^2$ or less, such as 3.8 lbs/ft$^2$ or less, such as 3.5 lbs/ft$^2$ or less, such as 3.3 lbs/ft$^2$ or less, such as 3 lbs/ft$^2$ or less, such as 2.8 lbs/ft$^2$ or less, such as 2.5 lbs/ft$^2$ or less. Such weight may be a dry weight such as after the board leaves the heating device (e.g., kiln).

The cement board may have a certain fastener holding, which generally is a measure of the force required to pull a cement board off of a wall by forcing a fastening nail through the board. The values obtained from the nail pull test generally indicate the maximum stress achieved while the fastener head penetrates through the board surface and core. In this regard, the cement board exhibits a fastener holding of at least about 30 lb$_f$, such as at least about 40 lb$_f$, such as at least about 50 lb$_f$, such as at least about 60 lb$_f$, such as at least about 70 lb$_f$, such as at least about 80 lb$_f$, such as at least about 85 lb$_f$, such as at least about 90 lb$_f$, such as at least about 95 lb$_f$, such as at least about 100 lb$_f$, such as at least about 110 lb$_f$, such as at least about 120 lb$_f$, such as at least about 130 lb$_f$, as tested according to ASTM C1396 and ASTM C473. The fastener holding may be about 200 lb$_f$ or less, such as 180 lb$_f$ or less, such as about 150 lb$_f$ or less, such as about 140 lb$_f$ or less, such as about 130 lb$_f$ or less, such as about 120 lb$_f$ or less, such as about 110 lb$_f$ or less, such as about 105 lb$_f$ or less, such as about 100 lb$_f$ or less, such as about 95 lb$_f$ or less, such as about 90 lb$_f$ or less. Such fastener holding may be based upon the thickness of the cement board. For instance, when conducting a test, such fastener holding values may vary depending on the thickness of the cement board. As an example, the fastener holding values above may be for a ⅝ inch cement board. However, it should be understood that instead of a ⅝ inch cement board, such fastener holding values may be for any other thickness cement board as mentioned herein. For instance, such fastener holding values may be for a ¼ inch cement board, a ½ cement board, a ¾ inch cement board, a 1 inch cement board, etc. In addition, such fastener holding values may be for a wet condition. Alternatively, such values may be for a dry condition. Further, such values may apply to both a wet and dry condition.

The cement board may have a certain compressive strength. For instance, the compressive strength may be about such as about 250 psi or more, such as about 500 psi or more, such as about 700 psi or more, such as about 900 psi or more, such as about 1,000 psi or more, such as about 1,100 psi or more, such as about 1,200 psi or more, such as about 1,250 psi or more, such as about 1,300 psi or more, such as about 1,500 psi or more as tested according to ASTM D2394. The compressive strength may be about 5,000 psi or less, such as about 4,000 psi or less, such as about 3,000 psi or less, such as about 2,500 psi or less, such as about 2,000 psi or less, such as about 1,800 psi or less, such as about 1,600 psi or less, such as about 1,500 psi or less, such as about 1,400 psi or less, such as about 1,300 psi or less, such as about 1,250 psi or less. Such compressive strength may be based upon the thickness of the cement board. For instance, when conducting a test, such compressive strength values may vary depending on the thickness of the cement board. As an example, the compressive strength values above may be for a ⅝ inch cement board. However, it should be understood that instead of a ⅝ inch cement board, such compressive strength values may be for any other thickness cement board as mentioned herein. For instance, such compressive strength values may be for a ¼ inch cement board, a ½ cement board, a ¾ inch cement board, a 1 inch cement board, etc.

The cement board may have a certain flexural strength. For instance, the flexural strength may be about such as about 250 psi or more, such as about 350 psi or more, such as about 400 psi or more, such as about 500 psi or more, such as about 600 psi or more, such as about 700 psi or more, such as about 750 psi or more, such as about 800 psi or more, such as about 1,000 psi or more as tested according to ASTM C1396 and ASTM C473. The flexural strength may be about 3,000 psi or less, such as about 2,500 psi or less, such as about 2,000 psi or less, 1,700 psi or less, such as about 1,500 psi or less, such as about 1,300 psi or less, such as about 1,100 psi or less, such as about 1,000 psi or less, such as about 900 psi or less, such as about 800 psi or less, such as about 750 psi or less. Such flexural strength may be based upon the thickness of the cement board. For instance, when conducting a test, such flexural strength values may vary depending on the thickness of the cement board. As an example, the flexural strength values above may be for a ⅝ inch cement board. However, it should be understood that instead of a ⅝ inch cement board, such flexural strength values may be for any other thickness cement board as mentioned herein. For instance, such flexural strength values may be for a ¼ inch cement board, a ½ cement board, a ¾ inch cement board, a 1 inch cement board, etc.

The cement board may have a certain modulus of rupture, which generally is a measure of the ability to resist deformation under load. The modulus of rupture may be tested in accordance with ASTM C78. The modulus of rupture may be determined after at least 21 days at 72° F. In this regard, the cement board exhibits a fastener holding of at least 300 psi, such as at least 400 psi, such as at least 500 psi, such as at least 600 psi, such as at least 700 psi, such as at least 800 psi, such as at least 900 psi, such as at least 1,000 psi, such as at least 1,100 psi, such as at least 1,200 psi. The modulus of rupture may be 2,000 psi or less, such as 1,700 psi or less, such as 1,500 psi or less, such as 1,300 psi or less, such as 1,100 psi or less, such as 1,000 psi or less, such as 900 psi or less, such as 800 psi or less, such as 700 psi or less. Such modulus of rupture may be based upon the thickness of the cement board. For instance, when conducting a test, such modulus of rupture values may vary depending on the thickness of the cement board. As an example, the modulus of rupture above may be for a ⅝ inch cement board. However, it should be understood that instead of a ⅝ inch cement board, such modulus of rupture may be for any other thickness cement board as mentioned herein. For instance, such modulus of rupture may be for a ¼ inch cement board, a ½ cement board, a ¾ inch cement board, a 1 inch cement board, etc.

The cement board disclosed herein may have many applications. For instance, the cement board may be utilized for interior or exterior applications. The cement board may be used as a standalone board in construction for the preparation of walls, ceilings, floors, etc. In addition, it may be utilized in an environment that may generally be humid or wet, such as shower rooms, bathrooms, lock rooms, etc. In addition, it may be utilized in an area requiring high impact resistance. For example, it may be utilized as a substrate for a stucco wall system or a masonry veneer wall system. Once the panel is affixed, as desired or necessary, another material may be affixed thereto such as, for example, ceramic tile, brick, marble panels, stucco or the like. Reinforced cementitious panels or boards having cores formed of a cementitious composition with a surface being reinforced is demonstrated in U.S. Pat. Nos. 1,439,954, 3,284,980, 4,450,022, and 4,916,004, which are hereby incorporated by reference in their entirety. In addition, cement boards with reinforced edges are disclosed in U.S. Pat. No. 6,187,409, which is hereby incorporated by reference in its entirety.

EXAMPLES

Test Methods

ASTM D4068, Annex A2: The water penetration test is conducted using three specimens of cement board each having a 3" by 3" dimension. A 2' long piece of 1" diameter ABS pipe was sealed to the cement board and subsequently filled with 2 ft head of water. The temperature was 73.4+/−4° F. and the test was conducted for 48 hours. If water passed through the board, a general change in color would be observed on the opposing side of the board indicating a failure of the test. Passing the test would require no water penetration for each of the three specimens.

Example 1

A cement board was prepared using sand, Portland cement, fly ash, limestone, calcium aluminate cement, expanded polystyrene beads, and calcium stearate. The fly ash was present in an amount of approximately 56.3 wt. %, the Portland cement was present in an amount of approximately 16.5 wt. %, the sand was present in an amount of approximately 19.5 wt. %, all based on the weight of the core. The calcium stearate was present in an amount of approximately 0.93 wt. %, based on the weight of the fly ash.

Once prepared, the cement board was tested to determine its effectiveness with regard to water penetration. The test was conducted using a hydrostatic test in accordance with ANSI A118.10 and ASTM D4068, Annex A2. Using such test method, the present inventors discovered that water did not pass through the board. As a comparative example with calcium stearate, the present inventors noticed the penetration of at least some water.

In addition, the water vapor permeation was tested in accordance with ASTM E 96/E96M-16, Procedure B. In particular, the test conditions includes a temperature of 73.4° F. and a relative humidity of 50+/−2%. Based on an average of five samples, the cement board demonstrated a water vapor permeance of 22 Perms (1,240 ng/Ps·s·m$^2$) and a water vapor transmission of 6.2 g/hr·m$^2$. Also during the testing, no water droplets were observed on the surface of the cement board.

Example 2

A cement board was prepared using sand, Portland cement, pozzolan material, limestone, calcium aluminate cement, expanded polystyrene beads, and calcium stearate. The dry weight percentage of each component in the board is provided in the table below.

| Component | Sample 2A (wt. %) | Sample 2B (wt. %) |
|---|---|---|
| Calcium stearate | 0.3% | 1.3% |
| Expanded polystyrene beads | 1.4% | 1.4% |
| Portland cement | 14.4% | 18.2% |
| Pozzolan | 58.2% | 53.4% |
| Sand | 20.7% | 20.0% |

Accordingly, the calcium stearate was present in an amount of approximately 0.52 wt. % and 2.43 wt. %, respectively, based on the weight of the pozzolan material. In addition, the calcium stearate was present in an amount of approximately 1.45 wt. % and 6.50 wt. %, respectively, based on the weight of the sand.

Once prepared, the cement board was tested to determine its effectiveness with regard to water penetration. The test was conducted using a hydrostatic test in accordance with ANSI A118.10 and ASTM D4068, Annex A2. Using such test method, the present inventors discovered that water did not pass through at least one specimen of the board.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A cement board, comprising:
a core having a first surface and a second surface opposite the first surface and a binder including a cement, a water-resistant additive comprising a metal salt of a fatty acid including a backbone carbon chain having from 12 to 60 carbon atoms, wherein the water-resistant additive is present in an amount of less than 5 wt. % to 0.3 wt. % or more based on the weight of the core, and a lightweight aggregate comprising expanded shale, expanded clay, expanded vermiculite, expanded perlite, expanded pumice, expanded glass, expanded polystyrene, polyurethane, hollow spheres, or a mixture thereof;
wherein the cement board exhibits a compressive strength of from 250 psi to 4,000 psi as determined in accordance with ASTM D2394.

2. The cement board of claim 1, wherein the cement comprises Portland cement, magnesia cement, alumina cement, calcium sulphoaluminate cement, or a mixture thereof.

3. The cement board of claim 1, wherein the binder further comprises a pozzolan material.

4. The cement board of claim 3, wherein the pozzolan material comprises fly ash, blast furnace slag, metakaolin, silica fume, microsilica, or a mixture thereof.

5. The cement board of claim 1, wherein the core further comprises a normal weight aggregate.

6. The cement board of claim 5, wherein the normal weight aggregate comprises sand, limestone, stone, shale, clay, granite, or a mixture thereof.

7. The cement board of claim 1, wherein the lightweight aggregate comprises expanded shale, expanded clay, expanded vermiculite, expanded perlite, expanded pumice, or a mixture thereof.

8. The cement board of claim 1, wherein the lightweight aggregate comprises expanded polystyrene beads.

9. The cement board of claim 8, wherein the expanded polystyrene beads have a bimodal particle size distribution.

10. The cement board of claim 1, wherein the core further comprises a retarder, an accelerator, or a mixture thereof.

11. The cement board of claim 1, wherein the core further comprises a sulfonate, a cellulose polymer derivative, a polysaccharide, a galactomannan, or a mixture thereof.

12. The cement board of claim 1, wherein the water-resistant additive is present in an amount of from 0.5 wt. % or more to 2 wt. % or less based on the weight of the core.

13. The cement board of claim 1, wherein the fatty acid comprises from 12 to 24 carbon atoms.

14. The cement board of claim 1, wherein the fatty acid comprises myristic acid, palmitic acid, arachidonic acid, montanic acid, octadecanoic acid, parinaric acid, or a mixture thereof.

15. The cement board of claim 1, wherein the fatty acid comprises stearic acid.

16. The cement board of claim 1, wherein the metal comprises an alkaline earth metal.

17. The cement board of claim 1, wherein the cement board indicates a water penetration having an area of 0.2 in$^2$ or less as determined in accordance with ANSI A118.10 and ASTM D4068, Annex A2.

18. The cement board of claim 1, wherein the cement board exhibits a water absorption of 8 wt. % or less as determined in accordance with ASTM C473.

19. The cement board of claim 1, wherein the cement board exhibits a water vapor permeance of 10 Perms or more as determined in accordance with ASTM E 96/E96M-16, Procedure B.

20. The cement board of claim 1, wherein the cement board exhibits a fastener hold of from 50 lb$_f$ to 200 lb$_f$ as determined in accordance with ASTM C1396 and ASTM C473.

21. The cement board of claim 1, wherein the cement board exhibits a modulus of rupture of from 500 psi to 2,000 psi as determined in accordance with ASTM C78.

22. The cement board of claim 1, wherein the cement board exhibits a compressive strength of from 500 psi to 3,000 psi as determined in accordance with ASTM D2394.

23. The cement board of claim 1, wherein the cement board exhibits a compressive strength of from 700 psi to 2,000 psi as determined in accordance with ASTM D2394.

24. The cement board of claim 1, wherein the cement board exhibits a compressive strength of from 900 psi to 1,500 psi as determined in accordance with ASTM D2394.

25. A cement board, comprising:
a core having a first surface and a second surface opposite the first surface and a binder including a cement and a water-resistant additive comprising a metal salt of a fatty acid including a backbone carbon chain having from 12 to 24 carbon atoms, wherein the water-resistant additive is present in an amount of less than 2 wt. % to 0.3 wt. % or more based on the weight of the core;
wherein the cement board exhibits a compressive strength of from 500 psi to 2,500 psi as determined in accordance with ASTM D2394.

* * * * *